3,037,969
ACRYLOXYALKYL-KETIMINES AND -ALDIMINES, POLYMERS AND PREPARATION THEREOF, AND PRIMARY AMINE MONOMERS AND POLYMERS DERIVED THEREFROM
Elinor M. Hankins, Philadelphia, and William D. Emmons, Huntingdon Valley, Pa., assignors to Rohm & Haas Company, Philadelphia, Pa., a corporation of Delaware
No Drawing. Filed June 20, 1960, Ser. No. 37,094
14 Claims. (Cl. 260—89.5)

This application concerns new compounds which may be generally designated as acryloxyalkyl-ketimines or acryloxyalkylaldimines. It is also concerned with the polymers thereof, the preparation of the monomers and their polymers, and novel primary amine monomers and polymers derivable from the ketimines and aldimines.

The new imine compounds are those having the formulas

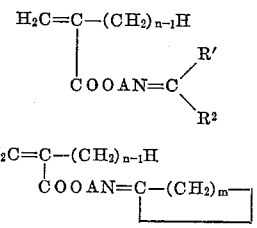

(I)

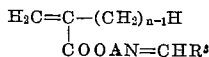

(II)

and $$H_2C=C-(CH_2)_{n-1}H$$
$$\overset{|}{C}OOAN=CHR^3$$

(III)

where
$m$ is an integer having a value of 4 to 5,
$n$ is an integer having a value of 1 to 2,
A is a $C_2$–$C_{12}$ alkylene group,
R' is a ($C_1$–$C_{12}$)alkyl or a cycloalkyl group,
$R^2$ is a ($C_1$–$C_{12}$)alkyl or a cycloalkyl group, and
$R^3$ is selected from the group consisting of phenyl, halophenyl, and alkoxyphenyl in which the alkoxy group has one to four carbon atoms.

The compounds designated hereinabove may be prepared by the transesterification of an ester of acrylic acid or methacrylic acid such as methyl methacrylate or methyl acrylate with a hydroxyalkyl-ketimine or hydroxyalkyl-aldimine of one of Formulas IV, V, and VI, respectively:

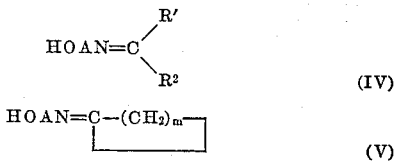

(IV)

(V)

and

HOAN=CHR³  (VI)

the symbols being defined as above. The compounds of formulas IV, V, and VI may be termed Schiff bases (Formulas IV, V, and VI). The reaction is effected under alkaline conditions in the presence of about ½ to 10% by weight, and preferably 1 to 5%, based on the weight of the starting materials, of a tetraalkyl titanate such as the tetraisopropyl or tetrabutyl titanate. No solvent is needed. While the starting materials may be employed in stoichiometrically equivalent amounts, it is preferred that the ester be employed in excess. The alcohol liberated during the transesterification is removed by azeotropic distillation of a mixture of the alcohol and the starting monomeric ester, such as methyl methacrylate or methyl acrylate. It is desirable that a polymerization inhibitor be employed such as para-hydroxydiphenylamine or diphenylenediamine. The reaction is generally carried out at temperatures of about 100° to 130° C. and the completion of the reaction can be determined by measuring the amount of alcohol removed and thereby determining when the theoretical amount of alcohol liberated has been taken out of the system by distillation.

Instead of using tetraalkyl titanate, the transesterification may be carried out in the presence of an alkali metal alkoxide, the amount thereof varying from 0.2% to 5%, preferably 1 to 3%, by weight, based on the weight of the starting materials. Whereas the use of tetraalkyl titanate is applicable to the preparation of both acrylates and methacrylates, the alkali metal alkoxide system is applicable primarily for the transesterification of methacrylates. Sodium methoxide or ethoxide as well as the potassium and lithium analogs may be employed. In this system, the ester and ketimine or aldimine are mixed and a solution of the alkoxide in an alkoxide in an alcohol such as methanol is added gradually. No additional solvent is needed, the ester itself serving this purpose. The temperature may be from 100° to 140° C. and is preferably not over 130° C.

The hydroxyalkyl-ketimines and the hydroxyalkyl-aldimines used to react with the esters may be any of those obtained by the reaction of an amino alcohol in which both the alcohol is primary and the nitrogen of the amine is primary with a ketone or an aldehyde particularly those listed hereinafter. Examples of the amino alkanols are as follows:

2-aminoethanol
2-aminopropanol-1
2-aminobutanol-1
3-aminobutanol-1
4-aminobutanol-1

Examples of the ketones include:
Cyclopentanone
Cyclohexanone
Acetone
Methyl ethyl ketone
Methyl propyl ketone
Methyl isobutyl ketone
Methyl isopropyl ketone
Diisobutyl ketone The aromatic aldehydes employed are benzaldehyde and substituted-benzaldehydes such as halo-benzaldehyde, e.g., p-chlorobenzaldehyde and m-methoxybenzaldehyde. The preparation of the hydroxyalkyl-ketimines and -aldimines is well known in the art and their preparation is no part of the present invention. In general, they are prepared by reaction of the hydroxyalkylamines with the ketones or aldehydes in bulk or within an inert solvent such as xylene, benzene, or toluene, adapted to form an azeotrope with the water to aid in its removal. The mixture is heated to a temperature of 100° C. or higher depending on the pressure in order to distill water.

The monomers of the present invention, having Formulas I, II, and III hereinabove, are colorless liquids and are reasonably stable at room temperature although if they are to be stored over long periods of time, it is advisable to maintain them under refrigeration. These monomers are characterized by two points of reactivity, one being the double bond in the acrylyl portion of the molecule by virtue of which the compounds are adapted to polymerize by the typical vinyl addition process to form linear polymers and copolymers. The double bond linkage of the imine group is hydrolyzable under acid conditions to form a primary amine salt. This hydrolysis may be effected on a polymer of the unsaturated imine yielding an aminoalkyl acrylate or methacrylate polymer in which the amine group contains a primary nitrogen atom. Such novel aminoalkyl acrylate and methacrylate polymers carrying a primary nitrogen atom attached to a carbon atom having two hydrogen atoms attached to it have been prepared for the first time by the present invention, and these polymers are part of the invention herein claimed.

The monomeric compounds of Formulas I II, and III may be suspended in an aqueous medium preferably in particulate form and upon acidification of the medium such as by means of acetic acid, phosphoric acid, sulfuric acid, and the like, the monomer is hydrolyzed to a primary amine which forms a salt of the acid present. This salt is polymerizable in aqueous systems. Thus, it may be dissolved in water and polymerized by water-soluble initiators or catalysts such as ammonium persulfate optionally with a reducing agent such as potassium metabisulfite in a redox system. Such polymers have high molecular weight and are applicable as a wet-strength resin in paper and for the flocculation of suspended matter in aqueous media to facilitate filtration, settling, and/or decantation.

The polymers and copolymers of the ketimines or aldimines of Formulas I, II, and III may be prepared by either a bulk, a solvent, or an aqueous emulsion technique using, in the case of solution polymerization, organic solvents such as benzene, toluene, xylene, acetone, dioxane, dimethylformamide, and acetonitrile, and azo catalysts such as diazodiisobutyronitrile and dimethyl-α,α'-azodiisobutyrate. The proportion of azo catalyst or initiator may be between 0.1% and 5% and is preferably between about 0.5% and 1.5%, on the weight of the total polymerizable materials.

The compounds of Formulas I, II, and III can be copolymerized with various other ethylenically unsaturated monomers, and especially the monoethylenically unsaturated monomers adapted to produce linear copolymers. Thus, copolymers may be made containing from about 0.5% to 99.5% by weight of a compound of Formulas I, II, or III with at least one of the following monomers: vinyl acetate, acrylonitrile, acrylamide, methacrylamide, styrene, vinyl-toluene, vinylidene chloride, vinyl chloride, vinyl laurate, esters of acrylic acid or methacrylic acid having from 1 to 18 carbon atoms in the alcohol moiety such as methyl methacrylate, methyl acrylate, ethyl acrylate, butyl acrylate or methacrylate, cyclohexyl acrylate or methacrylate, 2-ethylhexyl acrylate or methacrylate, dodecyl acrylate or methacrylate, and octadecyl acrylate or methacrylate.

The polymers and copolymers may be used in the formation of coatings, impregnants, and adhesives for paper textiles, leather, wood, and metals. Copolymers containing from 5 to 25% by weight of the unsaturated ketimine or aldimine of the invention can be mixed with polyepoxides for the production of insoluble and infusible cross-linked coatings. The copolymers may be employed in conjunction with other polymeric material for the production of special compositions for special uses. For example, copolymers prepared by the polymerization of an amine of Formulas I, II, or III in the presence of glue results in a polymer which is soluble in water and serves efficiently for the flocculation of suspended matter of either organic or inorganic material in aqueous media to facilitate the filtration or the settling and decantation of the system. Emulsion polymers of an imine of the present invention are useful also for the binding of pigments, for the stabilization of wool fabrics against shrinkage on laundering, and for the binding of fibers in non-woven fabrics. For this purpose, they may be used in conjunction with a polyepoxide of water-soluble or dispersible character. The bonded non-woven fabrics are not discolored by chlorine-bleaching or ironing.

Examples of epoxides that may be employed include both water-dispersible and/or organic solvent-soluble types such as dihydrodicyclopentadienyl ethers having the general formula

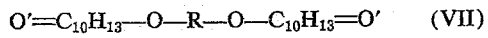

in which $C_{10}H_{13}$ is the radical of exo-dihydrodicyclopentadiene, the two O' groups are oxygen atoms which together with two adjacent carbon atoms in the $C_{10}H_{13}$ radicals form oxirane rings, and R is either (a) an alkylene group of 2 to 12 carbon atoms or (b) a radical of an etherified polyalkylene glycol, which radical has the formula $(R'—O—)_xR'$ in which R' is an alkylene group of 2 to 4 carbon atoms and $x$ is an integer having a value of 1 to 8 inclusive. These compounds and their production are described in U.S. Patent 2,543,419. There may also be used the "ethoxyline resins" available under the trade names of Epon or Araldite resins. They are polyether derivatives of a polyhydric phenol containing epoxy groups and may be prepared by effecting reaction between a polyhydroxyphenol or alcohol, for example, hydroquinone, resorcinol, glycerine, or condensation products of phenols with ketones, for instance, bis-(4-dihydroxydiphenyl)-2,2-propane, and epichlorohydrin. For example, the reaction of epicholorhydrin with bis-(4-hydroxyphenyl)-2,2-propane may be formulated as follows:

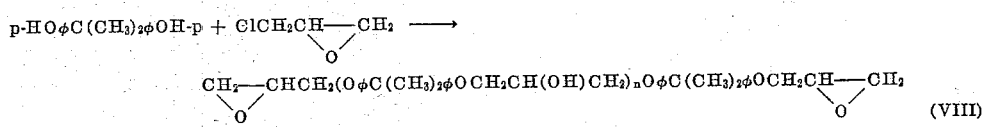

where φ is the phenylene group and n has an average value varying from around zero to about 7. These resins may be made by the method disclosed in 2,324,483, 2,444,333, British Patents 518,057 and 579,698. Many of these ethoxyline resins are sold under the name of Epon resins by Shell Chemical Corporation or Araldite resins by the Ciba Company. Data on the Epon resins are given in the table below:

TABLE I

| Epon No. | Epoxide Equivalent | Approximate Esterification Equivalent | M.P., 0° C. |
| --- | --- | --- | --- |
| RN-34 | 225–290 | 105 | 20–28. |
| RN-48 | 192 | 80 | 9. |
| 1064 | 300–375 | 105 | 40–45. |
| 1062 | 140–165 | | Liquid. |
| 1004 | 905–985 | 175 | 97–103. |
| 1007 | 1,600–1,900 | 190 | 127–133. |
| 1009 | 2,400–4,000 | 200 | 145–155. |
| 1001 | 450–525 | 130 | 64–76. |

Also, there may be used polyepoxides of the formula

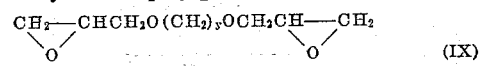

where y is a number having an average value of 2 to 4. Epon 562 is of this type, is liquid at normal room conditions and has an "Epoxide Equivalent" value of 140–165. Also, a diepoxide or triepoxide of glycerol may be used. These aliphatic polyepoxides may be prepared in the known fashion as described, for example in U.S. Patents 2,730,427 or 2,752,269. The preferred polyepoxides are those having average molecular weights of about 250 to 1,000.

The polymers of the imines can be treated with an acid such as acetic acid or phosphoric acid while suspended in water to effect hydrolysis of the imine group to primary amine nitrogen groups. This is a very rapid reaction even at room temperature but, in some cases, it may be accelerated by raising the temperature. The polymers thereby obtained have uses similar to those of the unhydrolyzed imine. They are useful for the making of adhesives and coatings of thermosetting character, especially when mixed with epoxides, binders for non-woven fabrics and for pigments in the pigment-dyeing and printing of textiles, and as lubricating oil additives for improving the viscosity index and pour point characteristics. They may be used for the stabilization of wool against shrinkage on washing and for the imparting of wet-strength to paper. They are also useful as flocculating agents to clarify, facilitate settling in, and to speed up filtration of, aqueous suspensions of both organic and inorganic matter.

The following examples are illustrative of the invention and the parts and percentages are by weight unless otherwise indicated.

EXAMPLE A

*Schiff Base from Ethanolamine and Diisobutyl Ketone*

A mixture of 710 grams (5 moles) of diisobutyl ketone, 305 grams (5 moles) of ethanolamine, and 400 grams of toluene in a glass reaction vessel equipped with a stirrer, thermometer, and condenser fitted through a water trap was refluxed with stirring and removal of water for 13 hours until no more water came over. The pot temperature increased from 116° to 130° C. and 139 ml. of lower aqueous layer was removed. The reaction mixture was distilled through a packed column, first at 20 to 29 mm. Hg remove toluene and unreacted starting material, and then to distill the product 2-[4-(2,6-dimethylheptylidene)-amino]-ethanol which was collected at 69–77° C./0.05 mm. Hg, $n_D^{25}$ 1.4567, 516.7 grams (55.8% yield) being obtained.

*Analysis.*—Calcd. for $C_{11}H_{23}NO$: C, 71.30%; H, 12.51%; N, 7.56%. Found: C, 71.03%; H, 12.62%; N, 7.57%, 7.63%. Titrated, N. 7.4%.

EXAMPLE B

*Schiff Base from Ethanolamine and Methyl Isobutyl Ketone*

A procedure similar to that of Example A was followed with 1,100 grams (11 moles) of methyl isobutyl ketone, 610 grams (10 moles) of ethanolamine, and 500 grams of toluene. A total of 185 ml. of water was removed in 12 hours with the pot temperature increasing from 104° to 130° C. The reaction mixture was distilled through a packed column at a reduced pressure produced by an aspirator pump. After removal of toluene and excess methyl isobutyl ketone, a product fraction was collected weighing 738.1 grams and containing 2-[2-(4-methylpentylidene)-amino]-ethanol which distilled over at 102° C./24 mm. Hg to 107° C./23 mm. Hg.

*Analysis.*—Calcd. percent for $C_8H_{17}NO$: C, 67.08; H, 11.96; N, 9.78. Found percent: C, 67.00; H, 11.98; N, 9.89.

EXAMPLE C

*Schiff Base from 3-Aminopropanol and Methyl Isobutyl Ketone*

A mixture of 375 grams (5 moles) of 3-aminopropanol, 500 grams (5 moles) of methyl isobutyl ketone, and 500 grams of benzene was heated with stirring and removal of water for eight hours until no more water was removed. A total of 82 ml. was separated. Benzene and any unchanged reagents were distilled off at reduced pressure and the residue was distilled through an 8 in. Vigreaux column. There was obtained 601.2 grams (76.7% yield) of the product 3-[2-(4-methylpentylidene)-amino]-propanol as a colorless liquid, boiling in the range of 69° C./0.7 mm. Hg to 90° C./1.4 mm. Hg, $n_D^{25}$ 1.4587.

*Analysis.*—Calcd. percent for $C_9H_{19}NO$: C, 68.74; H, 12.18; N, 8.91. Found percent: C, 68.73; H, 12.03; N, 9.2.

EXAMPLE D

*β-(Benzylideneamino)Ethanol*

To a mixture of 530 grams (5.0 moles) of benaldehyde and 500 grams of benzene in a glass reaction vessel equipped with a stirrer, thermometer, and condenser fitted through a water trap was added during 15 minutes 305 grams (5.0 moles) of ethanolamine. There was a rise in temperature to 70° C. The mixture was stirred and refluxed for 7 hours until no more water came over. A total of 90 ml. water was collected. After removal of benzene by distillation the residue was distilled at high vacuum. β-(Benzylideneamino)ethanol was obtained as a colorless liquid in 72.3% yield (538.1 grams), boiling in the range of 99° C./0.2 mm. Hg to 101° C./0.35 mm. Hg, $n_D^{25}$ 1.5725.

*Analysis.*—Calcd. percent for $C_9H_{11}NO$: C, 72.45; H, 7.43; N, 9.39. Found percent: C, 72.51; H, 7.46; N, 9.36.

EXAMPLE E

*12-(Cyclopentylideneamino)-Dodecanol-1*

A mixture of 5 gram-moles of cyclopentanone, 5 gram-moles of 12-amino-dodecanol-1, and 600 grams of xylene in a glass reaction vessel was refluxed and water evaporated and condensed was removed. The reaction mixture was then distilled under high vacuum to remove xylene and unreacted starting material and then to distill the product boiling at 130° C./0.1 mm. Hg to 140° C./0.3 mm. Hg.

EXAMPLE 1

*(a) Diisobutyl Ketimine of Aminoethyl Methacrylate*

A mixture of 300 grams (3.0 moles) of methyl methacrylate, 277.5 grams (1.5 moles) of the imino-alcohol from ethanolamine and diisobutyl ketone obtained in Example A, and 11.1 grams (0.06 mole) of p-hydroxydiphenylamine (inhibitor) in a glass reaction vessel equipped with stirrer, thermometer, and small graduated dropping funnel, and under a packed column with an automatic take-off set at 70° C. was heated with stirring and catalyzed by portionwise addition of 6.0 ml. (5.65 grams, 0.026 mole) of 25% sodium methoxide in methanol. The methanol methyl methacrylate azeotrope was distilled off over a period of about 3½ hours as the temperature in the reaction vessel went from 106° to 130° C., the overhead temperature remaining at about 65° throughout.

When essentially no more distillate came over, the reaction mixture was cooled immediately. The 71.0 grams of distillate, 56.5 grams, $n_D^{20}$ 1.3426 contained 47.5 grams methanol by calculation; theoretical weight was 52.5 grams.

After addition of 6 grams of inhibitor excess methyl methacrylate (125 grams) was distilled off at water pump pressure. The residue was fractionated at high vacuum through a packed column, giving 260.7 grams (69% yield) of the product 2-[-4-(2,6-dimethylheptylidene)-amino]-ethyl methacrylate, boiling in the range of 102.5° C./0.45 mm. Hg to 104.5° C./0.5 mm. Hg, $n_D^{25}$=1.4548.

*Analysis.*—Calcd. percent for $C_{15}H_{27}NO_2$: C, 71.10; H, 10.74; N. 5.35. Found percent: C, 7091; H, 10.81; N, 5.45.

*(b) Diisobutyl Ketimine of Aminoethyl Methacrylate*

A mixture of 185 grams (1.0 mole) of the imino-alcohol from ethanolamine and diisobutyl ketone obtained, 340 grams (3.4 moles) of methyl methacrylate, and 6.8 grams of diphenylphenylenediamine was placed in a glass reaction vessel equipped wtih stirrer, thermometer, and a packed column with an automatic take-off distilling head. The mixture was stirred and heated to distill off any water present in the reagents. Thirty grams of distillate was collected from 98.5° to 100.5° C. with the pot temperature 111° C. The mixture was allowed to cool to 88° C. and 6.36 grams of tetraisopropyl titanate was added. The mixture was heated with stirring and methanol-methyl methacrylate azeotrope was distilled off to 70° C. The overhead temperature was 68° to 70° C. and the pot temperature increased from 106° to 120° C. After 2¾ hours, no more methanol came over and the mixture was cooled immediately. A total of 63 ml. of methanol and methyl methacrylate was collected, 52.9 grams, $n_D^{20}$ 1.3581; this contained 34.8 grams of methanol.

After adding 5 grams of inhibitor, 201.2 grams of excess methyl methacrylate was distilled off at reduced pressure to 35° C./40 mm. Hg. The residue was fractionated to yield 159.4 grams of the product boiling at 112° C./0.7 mm. Hg.

*Analysis.*—Calcd. percent for $C_{15}H_{27}NO_2$: C, 71.10; H, 10.74; N, 5.53. Found percent: C, 70.73; H, 10.70; N, 5.45.

(c) In similar fashion the diisobutyl ketimine of β-aminoethyl acrylate was obtained, using 3 moles of methyl acrylate instead of the methyl methacrylate.

(d) The methacrylate of 12-(cyclopentylideneamino)-dodecanol-1 was prepared by the process of part (a) hereof substituting the product of Example E for the imino-alcohol used in part (a).

(e) The methyl isobutyl ketimine of aminoethyl acrylate was obtained by the process of part (b) hereof substituting 3 moles of ethyl acrylate for the methyl methacrylate and the Schiff base from β-aminoethanol and methyl isobutyl ketone (obtained as in Example B) for the imino-alcohol used in part (b).

(f) The methyl isobutyl ketimine of 3-aminopropanol acrylate was obtained by the process of part (b) hereof substituting 3 moles of ethyl acrylate for the methyl methacrylate and the Schiff base from 3-aminopropanol and methyl isobutyl ketone (obtained as in Example C) for the imino-alcohol used in part (b).

EXAMPLE 2

(a) *Methyl Isobutyl Ketimine of Aminoethyl Methacrylate*

A procedure similar to that of Example 1 was followed with 300 grams (3.0 moles) of methyl methacrylate, 214.7 grams (1.5 moles) of the imino-alcohol from ethanolamine and methyl isobutyl ketone (Example B), 11.1 grams (0.06 mole) of p-hydroxydiphenylamine, and 6.6 ml. (6.2 grams, 0.029 mole) of 25% sodium methoxide in methanol. In 5 hours, the pot temperature was increased from 93° to 134° C. and 78 ml., 61.5 grams, of methanol-methyl methacrylate distillate, $n_D^{20}$ 1.3427, was collected. This corresponded to 51.7 grams of the theoretical 52.6 grams of methanol. Five grams of inhibitor was added to the reaction mixture and, after removal of 112 grams of excess methyl methacrylate, the product was fractionated by distillation through a packed column, yielding 65.3 grams of a product boiling in the range of 78° C./0.2 mm. Hg to 79° C./0.25 mm. Hg, having an $n_D^{25}$ of 1.4532.

*Analysis.*—Calcd. percent for $C_{12}H_{21}NO_2$: C, 68.21; H, 10.02; N, 6.63. Found percent: C, 68.08; H, 10.22; N, 6.57.

(b) The procedure of part (a) is repeated replacing the methyl methacrylate with 3 moles of ethyl methacrylate.

EXAMPLE 3

(a) *β-Benzylideneaminoethyl Methacrylate*

Two hundred and fifty grams (250 grams, 2.5 moles) of methyl methacrylate, 149 grams (1.0 mole) of benzylideneaminoethanol (Example D), and 5 grams of diphenylphenylenediamine was stirred and heated to distill off 50.9 grams of methyl methacrylate and any water present on the reagents. The overhead temperature increased from 78° to 100.5° C. and the pot temperature from 112° to 114° C. during the distillation. The mixture was allowed to cool to 70° C. and 4.2 grams of tetraisopropyl titanate was added. After ¾ hour at a pot temperature of 113° C., only 3.5 ml. of distillate boiling at 70° to 71° C. had come over so 4.08 grams more of catalyst was added after cooling to a pot temperature of 100° C. The mixture was heated and stirred for a period of over four hours at an overhead temperature of 68° to 72° C. and a pot temperature of 111° to 125° C. with the removal of a mixture of methanol and methyl methacrylate distillate containing the theoretical 32 grams of methanol.

After addition of 3.3 grams of diphenylphenylenediamine to the residue excess methanol methacrylate was distilled off at reduced pressure. The residue was then distilled off at high vacuum through a packed column, giving 102.4 grams of product which on redistillation yielded 73.7 grams of the product boiling in the range of 112° C./0.5 mm. Hg to 115° C./0.15 mm. Hg having an $n_D^{25}$ of 1.5322.

*Analysis.*—Calcd. percent for $C_{13}H_{15}NO_2$: C, 71.86; H, 6.96; N, 6.45; Br. No. 73.57. Found: C, 71.79; H, 7.16; N, 6.52; Br. No. 74.1.

(b) In the same way the corresponding acrylate was prepared using methyl acrylate instead of methyl methacrylate.

EXAMPLE 4

*Methyl Isobutyl Ketimine of Aminopropyl Methacrylate*

A mixture of 157 grams (1 mole) of 3-aminopropanol-methyl isobutyl ketone condensate (Example C), 200 grams (2.0 moles) of methyl methacrylate, and 5.55 grams (0.03 mole) of p-hydroxydiphenylamine was placed in a glass reaction vessel equipped with stirrer, thermometer, small graduated dropping funnel, and with a 35 cm. helix packed column with an automatic take off distilling head set at 70° C. The mixture was heated with stirring and 3.8 ml. of a 25% solution of sodium methoxide in methanol was added in portions over 3 hours. The overhead temperature was 64.5° to 66.5° C. and the bath temperature increased from 103° to 137° C. A total of 44.0 grams of methanol-methyl methacrylate distillate containing 34.0 grams of methanol was collected.

After addition of 2 grams of inhibitor, excess methyl methacrylate was distilled off at reduced pressure. The residue was fractionated by distillation yielding 143 grams of product which on redistillation produced 82.8 grams of product boiling in the range 102° C./0.8 mm. Hg to 116° C./1.6 mm. Hg, having an $n_D^{25}$ of 1.4550.

*Analysis.*—Calcd. percent for $C_{13}H_{23}NO_2$: C, 69.29; H, 10.29; N, 6.22. Found: percent C, 68.57; H, 10.15; N, 5.87.

EXAMPLE 5

(a) *Phosphoric Acid Salt of Aminoethyl Methacrylate*

A mixture of 42.2 grams (0.2 mole) of the methyl isobutyl ketimine of aminoethyl methacrylate and 40 grams of water was cooled to 0° to 5° C. and 23.06 grams (0.2 mole) of 85% phosphoric acid was added slowly at 0° to 5° C. in ¾ hour. The amine salt precipitated. After ½ hour at 0° to 5° C., 400 ml. of acetone was added and the cold mixture was filtered with suction. The precipitate was rinsed with acetone and dried in a vacuum desiccator. There was obtained 28.7 grams (63.3%) of the phosphoric acid salt of aminoethyl methacrylate as a white crystalline solid.

*Analysis.*—Calcd. percent for $C_6H_{11}NO_2$—$H_3PO_4$: C, 31.72; H, 6.21; N, 6.17; P, 13.64; Br. No. 70.36. Found percent: C, 31.75; H, 6.19; N, 6.11; P, 13.58; Br. No. 69.

(b) In the same way the phosphoric acid salt of 12-aminododecyl methacrylate was obtained by substituting the ketimine of Example 1(c) for that used in part (a).

(c) The phosphoric acid salt of 3-aminopropyl acrylate was similarly obtained from the ketimine of Example 4(b).

EXAMPLE 6

(a) Homopolymer of Methyl Isobutyl Ketimine of Aminoethyl Methacrylate

A solution of 10 grams of monomer of Example 2(a), 20 grams of benzene, and 0.05 gram of benzoyl peroxide was heated under nitrogen for 16 hours at 65°. There resulted a solution of the homopolymer of methyl isobutyl ketimine of aminoethyl methacrylate with a viscosity of 2.5 poises.

(b) Homopolymer of Methyl Isobutyl Ketimine of Aminopropyl Methacrylate

The procedure of part (a) using the monomer of Example 4(a) gave a benzene solution of the homopolymer of the methyl isobutyl ketimine of aminopropyl methacrylate with a viscosity of 17.5 poises.

EXAMPLE 7

(a) Homopolymer of Phosphoric Acid Salt of Aminoethyl Methacrylate

A mixture of 21.1 grams (0.1 mole) of the methyl isobutyl ketimine of aminoethyl methacrylate and 30 grams of water in a separatory funnel was cooled in ice and 11.53 grams (0.1 mole) of 85% phosphoric acid was added slowly with shaking and cooling. The upper layer (10.1 grams) of methyl isobutyl ketone was removed leaving an aqueous solution of 0.1 mole of the phosphoric acid salt of aminoethyl methacrylate. This solution was divided in half, placed in 4 oz. bottles, and each was diluted to 30 grams. Nitrogen was bubbled through the solutions. To one (A) was added 0.075 gram of ammonium persulfate and 0.0375 gram of sodium hydrosulfite, and to the other (B) was added 0.05 gram of ammonium persulfate and 0.025 gram of sodium hydrosulfite. As polymerization proceeded, water was gradually added to each in 10-gram increments to avoid gelation; water was added whenever the viscosity reached about 3.3 poises. Nitrogen was bubbled through the solutions for 18 hours. At the end of this time there was obtained two solutions of the homopolymer of the phosphoric acid salt of aminoethyl methacrylate of about 13% solids having viscosities of about 4 (A) and 6.3 (B) poises, respectively.

(b) Homopolymer of phosphoric acid salt of 12-aminododecyl methacrylate was prepared by the procedure of part (a) substituting the monomer obtained in Example 1(c) for that used in part (a).

EXAMPLE 8

(a) Homopolymer of Acetic Acid Salt of Aminoethyl Methacrylate

To a cooled mixture of 21.1 grams (0.1 mole) of the methyl isobutyl ketimine of aminoethyl methacrylate and 30 grams of water was added with cooling and mixing a solution of 6 grams (0.1 mole) of acetic acid in 20 grams of water. The layers were separated. The upper layer was 10 grams of methyl isobutyl ketone. The lower layer was divided in half and each half was placed in an 8 oz. bottle and diluted to 30 grams. Nitrogen was bubbled in and the solutions were catalyzed, (A) with 0.1 gram of ammonium persulfate and 0.05 gram of sodium hydrosulfite and (B) with 0.075 gram of ammonium persulfate and 0.0375 gram of sodium hydrosulfite. As polymerization proceeded at room temperature, in order to avoid gelation, water was added in 10- and 20-gram increments when the viscosity reached about 3.3 poises. After 20 hours there was obtained solutions of the homopolymers of the acetic acid salt of aminoethyl methacrylate of 3.5% and 4.3% solids, respectively, and having viscosities of 0.9 and 1.2 poises, respectively.

(b) Homopolymer of Acetic Acid Salt of Aminoethyl Acrylate

The procedure of part (a) is repeated using the acrylic acid ester monomer obtained in Example 1(b) instead of the methacrylate.

EXAMPLE 9

Homopolymer of Phosphoric Acid Salt of Aminopropyl Methacrylate

A mixture of 22.5 grams (0.1 mole) of the methyl isobutyl ketimine of aminopropyl methacrylate and 30 grams of water was cooled and 11.53 grams (0.1 mole) of 85% phosphoric acid was added slowly with cooling and mixing. The upper layer (8.0 grams) of methyl isobutyl ketone was removed. The lower layer, a solution of the phosphoric acid salt of aminopropyl methacrylate, was divided in half. Each half was diluted to 30 grams and, as nitrogen was bubbled in, was catalyzed, (A) with 0.1 gram of ammonium persulfate and 0.05 gram of sodium hydrosulfite and (B) with 0.075 gram of ammonium persulfate and 0.0375 gram of sodium hydrosulfite. Water was added to moderate the polymerization whenever the viscosity reached approximately 3.3 poises. At the end of 18 hours, there was obtained two solutions of the homopolymer of the phosphoric acid salt of aminopropyl methacrylate having about 12% solids and viscosities of about 1.5 and 2.8, respectively.

EXAMPLE 10

Homopolymer of Acetic Acid Salt of Aminopropyl Methacrylate

A procedure like that of Example 9 was followed with the phosphoric acid replaced by a solution of 6.0 grams (0.1 mole) of acetic acid in 20 grams of water. Catalysts used were 0.1 gram of ammonium persulfate and 0.05 gram of sodium hydrosulfite for (A) and 0.075 gram of ammonium persulfate and 0.0375 gram of sodium hydrosulfite for (B). There resulted solutions containing about 4.5% of the homopolymer of the acetic acid salt of aminopropyl methacrylate and having viscosities of about 1.2 and 1.4 poises, respectively.

EXAMPLE 11

A homopolymer of the phosphoric acid salt of aminoethyl methacrylate (prepared as in Example 7(a) and having a viscosity of 3 poises at about 10% concentration) was added with alum to a naturally turbid water. After stirring the water at 100 r.p.m. for 5 minutes and at 30 r.p.m. for 15 mintues, the stirring was discontinued and the flocs were allowed to settle. Samples of the treated water were removed after settling times of 3 and 30 minutes respectively, and the turbidity remaining was measured as p.p.m. as $SiO_2$ on the Hellige Turbidimeter.

In Table I the results of such tests are given; in some cases alum and clay were also added as indicated.

TABLE I

| Original Water Turbidity, p.p.m. | Reagents, p.p.m. Added | | | Turbidity, p.p.m. | |
|---|---|---|---|---|---|
| | Alum | Clay | Polymer (B) | 3 min. | 30 min |
| 252 | 35 | | | 51.0 | 35.0 |
| | 35 | | 0.5 | 30.0 | 21.0 |
| | 35 | 25 | | 76.0 | 22.0 |
| | 35 | 25 | 0.5 | 8.5 | 4.5 |
| | 35 | 25 | 1.0 | 11.0 | 6.5 |

EXAMPLE 12

Homopolymers of the acetic and phosphoric acid salts of aminoethyl and aminopropyl methacrylate (prepared from isobutyl ketimine) were examined as wet strength resins. Paper sheets were prepared with bleached sulfite (480 ml. Canadian freeness) containing 2% polymer on dry weight of fiber. The pulp and dilution water were adjusted to pH 4.0, 6.0, and 9.0. These resins gave maximum wet strength at pH 9.0. The results are given in Table II:

TABLE II

| Polymer $H_2C=C(CH_3)COO(CH_2)_nNH_2 \cdot HX$ | | Catalyst | pH | Wet Tensile Strength (lbs./inch width) | | | |
|---|---|---|---|---|---|---|---|
| n | HX | | | 1 | 7 | 10 | 28 days |
| 2 | $H_3PO_4$ | NaOH | 9.0 | 3.8 | | 4.4 | 5.3 |
| 2 | $H_3PO_4$ | 3% Alum+$H_2SO_4$ | 4.5 | 3.0 | | 3.3 | 3.8 |
| 2 | HOAc | NaOH | 9.0 | 3.7 | 4.65 | | 5.4 |
| 2 | HOAc | None | 6.1 | 3.1 | 3.6 | | 4.0 |
| 2 | HOAc | 3% Alum+$H_2SO_4$ | 4.5 | 2.7 | 3.0 | | 3.4 |
| 3 | $H_3PO_4$ | NaOH | 9.0 | 4.8 | 5.4 | | 6.2 |
| 3 | $H_3PO_4$ | $H_2SO_4$ | 4.5 | 2.2 | 2.6 | | 2.8 |

EXAMPLE 13

(a) A mixture of 12.0 grams (0.12 mole) of methyl methacrylate and 8.44 grams (0.04 mole) of the methyl isobutyl ketimine of aminoethyl methacrylate, 40.8 grams of benzene, and 0.204 gram of azoisobutyronitrile was heated at 65° C. under nitrogen for 16 hours. The resulting solution (viscosity, 2 poises) was poured into petroleum ether. The precipitated copolymer was dissolved in acetone and reprecipitated with petroleum ether. This was repeated. The copolymer was dried for 24 hours at 0.5 mm. Hg. There was obtained 18.7 grams of a cream-colored solid, the infrared spectrum of which was consistent with that expected for a copolymer of the two monomers. A solution in acetone containing 20% of the copolymer was used to coat panels of wood, steel and glass, yielding hard, glossy coatings after drying at room temperature.

(b) Similar results are obtained in coatings obtained from copolymers prepared by the procedure of part (a) with the methyl isobutyl ketimine of aminopropyl methacrylate (obtained in Example 4).

EXAMPLE 14

A series of copolymers was prepared by heating under nitrogen for 16 hours at 65° C. solutions containing 17.04 grams (0.12 mole) of butyl methacrylate, 10.12 grams (0.04 mole) of the diisobutyl ketimine of aminoethyl methacrylate, 54.32 grams of benzene, and varying amounts of azoisobutyronitrile as initiator. The resulting copolymer solutions had viscosities ranging from 0.5 poise (6% initiator on monomers) to about 5 poises (1% initiator on monomer). Tough, glossy coatings were prepared on wood, glass and steel from the solutions after diluting to 15% concentration with toluene.

EXAMPLE 15

A mixture of 11 grams of the diisobutyl ketimine of aminoethyl methacrylate (of Example 1(a)), 89 grams of acrylonitrile, 200 grams of dimethylformamide, 0.5 gram of mercaptoethanol, 0.1 gram of dimethyl azodiisobutyrate is heated at 65° C. under nitrogen for sixteen hours. The polymerization mixture may be poured into acetone to precipitate the polymer, or extruded through a 40 hole spinneret (each hole of 0.025 inch diameter) into an aqueous bath to form filaments which are stretched 100% and dried. The filaments show improved dyeing characteristics as compared to poly(acrylonitrile) especially to acid dyes.

EXAMPLE 16

A similar procedure is followed with 10 grams of the diisobutyl ketimine of aminoethyl acrylate prepared as in Example 1(b), 87 grams of vinyl acetate, 3 grams of acrylamide, 220 grams of dimethylformamide, and 4.5 grams of dimethyl azodiisobutyrate. There is obtained 97 grams of a white solid copolymer.

EXAMPLE 17

A solution containing 10 grams of the methacrylate of 12-(cyclopentylideneamino)-dodecanol-1, 90 grams of a mixture of lauryl and myristyl methacrylates, 250 grams of toluene, 0.5 gram of mercaptoethanol, and 1.5 grams of dimethyl azodiisobutyrate is heated at 65° C. under nitrogen for sixteen hours. The polymerization mixture is mixed with a midcontinent lubricating oil in a concentration of 0.5% and serves to depress the pour point and reduce the tendency to form carbon deposits.

EXAMPLE 18

A solution containing 10 grams of β-benzylideneaminoethyl methacrylate, 90 grams of a mixture of lauryl and myristyl methacrylates, 250 grams of toluene, 0.5 gram of mercaptoethanol, and 1.5 grams of dimethyl azodiisobutyrate is heated at 65° C. under nitrogen for sixteen hours. The polymerization mixture is mixed with a midcontinent lubricating oil in a concentration of 0.5% and serves to depress the pour point and reduce the tendency to form carbon deposits.

EXAMPLE 19

Six and four-tenths grams (6.4 grams) of a diepoxide having an epoxide equivalent of about 200 grams/mole and a molecular weight of about 400 obtained by the condensation of epichlorohydrin with 4,4'-isopropylidine-bisphenol was added to 33.6 grams of a 33⅓% solution in benzene of a copolymer of butyl methacrylate; and the diisobutyl ketimine of aminoethyl methacrylate (the copolymer solution having a viscosity of about 5 poises) (this mixture herein designated (A) providing a 3:1 molar ratio diepoxide:copolymer). Another mixture (B) of the same proportions and concentrations of diepoxide and copolymer was prepared from a similar copolymer solution with a viscosity of about 0.5 poise.

Films were prepared from the mixtures (A) and (B) on cold-rolled steel and allowed to air dry at 77° C. and 50% relative humidity. Clear, tough, flexible, smooth coatings resulted. The time to a tack-free condition was one day.

Harder films were obtained by baking the dried films for 15 minutes at 300° F.

We claim:

1. As new compositions of matter, a compound selected from the group consisting of those having the Formulas I, II, and III:

$$H_2C=C-(CH_2)_{n-1}H \atop COOAN=C{\overset{R'}{\underset{R^3}{\diagdown}}} \qquad (I)$$

$$H_2C=C-(CH_2)_{n-1}H \atop COOAN=C-(CH_2)_m\rule[-0.4em]{0.4pt}{1em}\!\!\_\!\!\_\!\!\_\!\!\_\!\!\_ \qquad (II)$$

and $$H_2C=C-(CH_2)_{n-1}H \atop COOAN=CHR^3 \qquad (III)$$

where m is an integer having a value of 4 to 5,
n is an integer having a value of 1 to 2,
A is a $C_2$–$C_{12}$ alkylene group, R' is selected from the group consisting of $(C_1-C_{12})$-alkyl and cycloalkyl groups, $R^2$ is selected from the group consisting of $(C_1-C_{12})$-alkyl and cycloalkyl groups, and $R^3$ is selected from the group consisting of phenyl, halophenyl, and $(C_1-C_4)$alkoxyphenyl groups.

2. An addition homopolymer of a compound as defined in claim 1.

3. An addition copolymer of about 0.5 to about 99.5% by weight of a compound as defined in claim 1 with at least one other monoethylenically unsaturated compound.

4. As a composition of matter, 2-[4-(2,6-dimethylheptylidene)-amino]-ethyl methacrylate.

5. As a composition of matter, 3-(2-(4-methylpentylidene)-amino)-propyl methacrylate.

6. As a composition of matter, β-(benzylideneamino)-ethyl methacrylate.

7. As a composition of matter, 3-(2-(4-methylpentylidene)-amino)-ethyl methacrylate.

8. As a composition of matter, 2-[4-(2,6-dimethylheptylidene)-amino]-ethyl acrylate.

9. As a composition of matter, 12-(cyclopentylideneamino)-dodecyl methacrylate.

10. A method for preparing an unsaturated imine which comprises transesterifying an ester of an acid of the formula

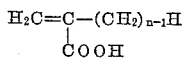

where $n$ is an integer having a value of 1 to 2, and an alcohol having 1 to 12 carbon atoms with a hydroxyl-alkylimine selected from the group consisting of those having the formulas

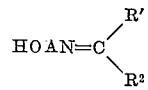

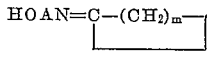

and $$HOAN=CHR^3 \quad (VI)$$

in which $m$ is an integer having a value from 4 to 5,

A is a $(C_2-C_{12})$alkylene group,

R' is selected from the group consisting of $(C_1-C_{12})$-alkyl and cycloalkyl groups, $R^2$ is selected from the group consisting of $(C_1-C_{12})$-alkyl and cycloalkyl groups, and $R^3$ is selected from the group consisting of phenyl, halophenyl, and $(C_1-C_4)$alkoxyphenyl groups, in an alkaline medium.

11. A process as defined in claim 10 in which the transesterification is effected in the presence of about ½ to 10% by weight of a tetraalkyl titanate, the weight thereof being based on the weight of re-agents.

12. A process of preparing a methacryloxyalkylimine which comprises reacting methyl methacrylate and a hydroxyalkylimine selected from the group consisting of those having the formulas IV, V, and VI:

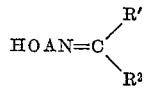

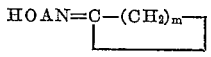

and $$HOAN=CHR^3 \quad (VI)$$

in which

A is a $(C_2-C_{12})$alkylene group, $m$ is an integer having a value of 4 to 5, R' is selected from the group consisting of $(C_1-C_{12})$-alkyl and cycloalkyl groups, $R^2$ is selected from the group consisting of $(C_1-C_{12})$-alkyl and cycloalkyl groups, and $R^3$ is selected from the group consisting of phenyl, halophenyl, and $(C_1-C_4)$alkoxyphenyl groups, in the presence of an alkali metal alkoxide at a temperature of about 100° to 140° C.

13. A process which comprises hydrolyzing an imine selected from the group consisting of those having the Formulas I, II, and III:

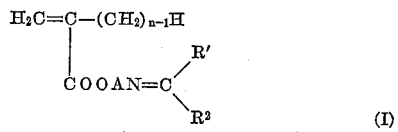

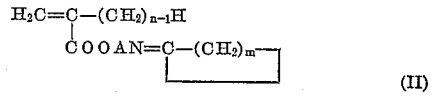

and

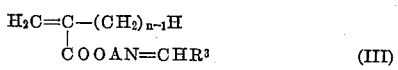

where $m$ is an integer having a value of 4 to 5, $n$ is an integer having a value of 1 to 2, A is a $C_2-C_{12}$ alkylene group, R' is selected from the group consisting of $(C_1-C_{12})$-alkyl and cycloalkyl groups, $R^2$ is selected from the group consisting of $(C_1-C_{12})$-alkyl and cycloalkyl groups, and $R^3$ is selected from the group consisting of phenyl, halophenyl, and $(C_1-C_4)$alkoxyphenyl groups, in an acid medium, thereby producing an acid salt of an amine of the formula

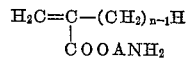

14. A process comprising the step of hydrolyzing an addition polymer of at least one compound selected from the group having the formulas

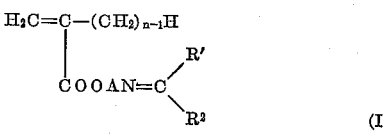

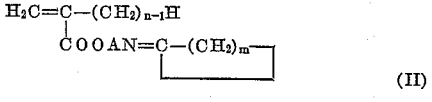

and

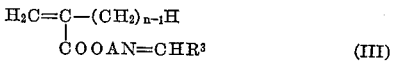

where $m$ is an integer having a value of 4 to 5, $n$ is an integer having a value of 1 to 2, A is a $C_2-C_{12}$ alkylene group, R' is selected from the group consisting of $(C_1-C_{12})$-alkyl and cycloalkyl groups, $R^2$ is selected from the group consisting of $(C_1-C_{12})$-alkyl and cycloalkyl groups, and $R_3$ is selected from the group consisting of phenyl, halophenyl, and $(C_1-C_4)$alkoxyphenyl groups, in the presence of an acid, thereby producing a polymer of a compound of the formula

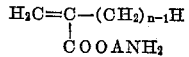

References Cited in the file of this patent

UNITED STATES PATENTS

| | | |
|---|---|---|
| 2,433,979 | Billman | Jan. 6, 1948 |
| 2,744,885 | de Benneville et al. | May 8, 1956 |
| 2,838,397 | Gruntfest et al. | June 10, 1958 |